April 3, 1951 H. S. SPEICHER 2,547,143
SEED SOWER
Filed Jan. 3, 1950 4 Sheets-Sheet 1
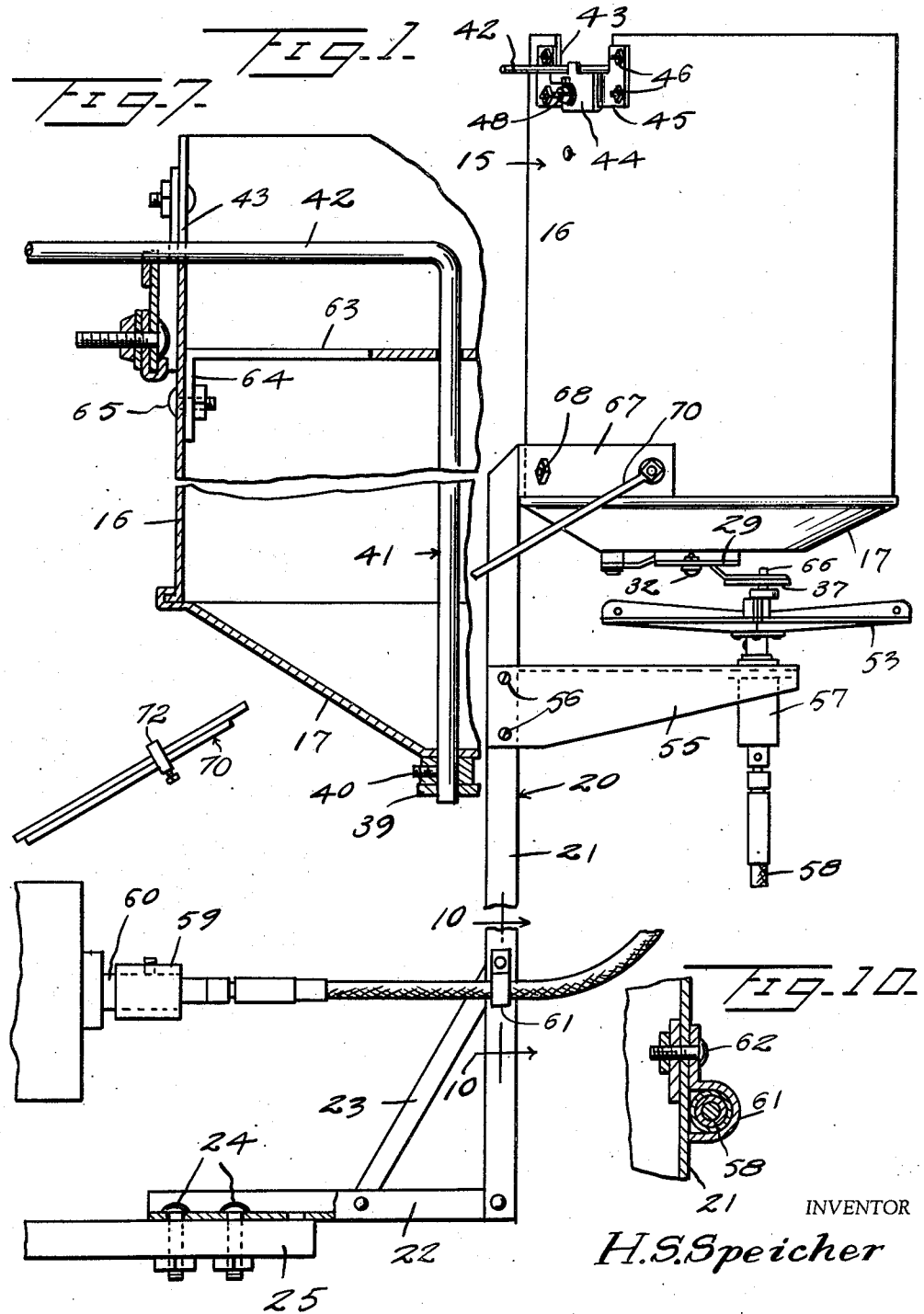
INVENTOR
H. S. Speicher
BY Kimmel & Crowell
ATTORNEYS

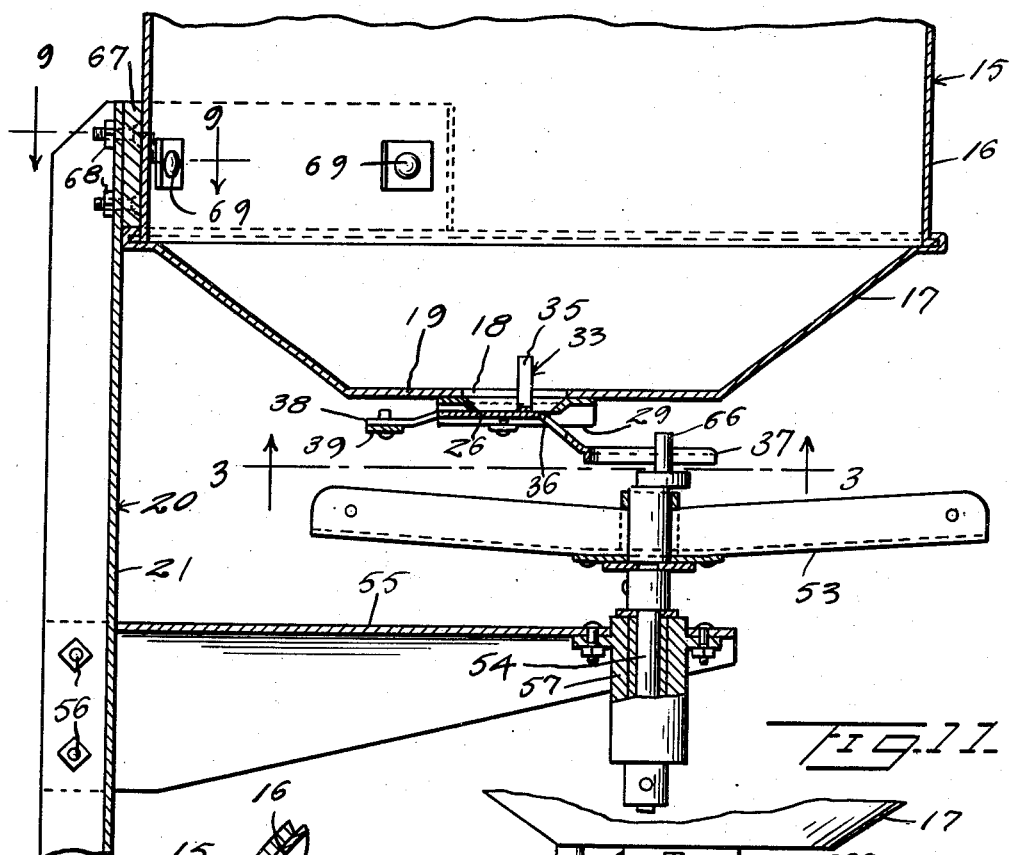

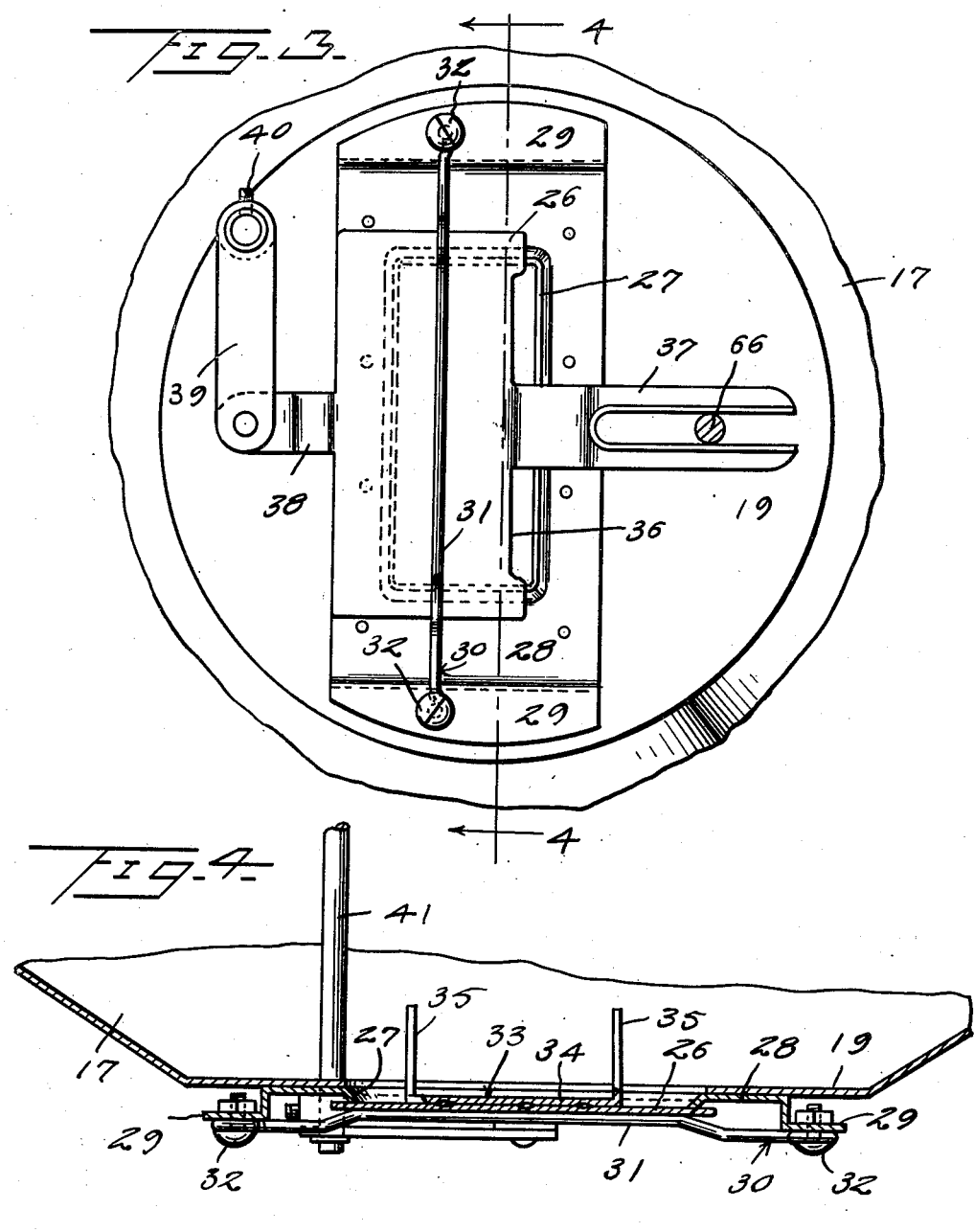

April 3, 1951     H. S. SPEICHER     2,547,143
SEED SOWER
Filed Jan. 3, 1950     4 Sheets-Sheet 4
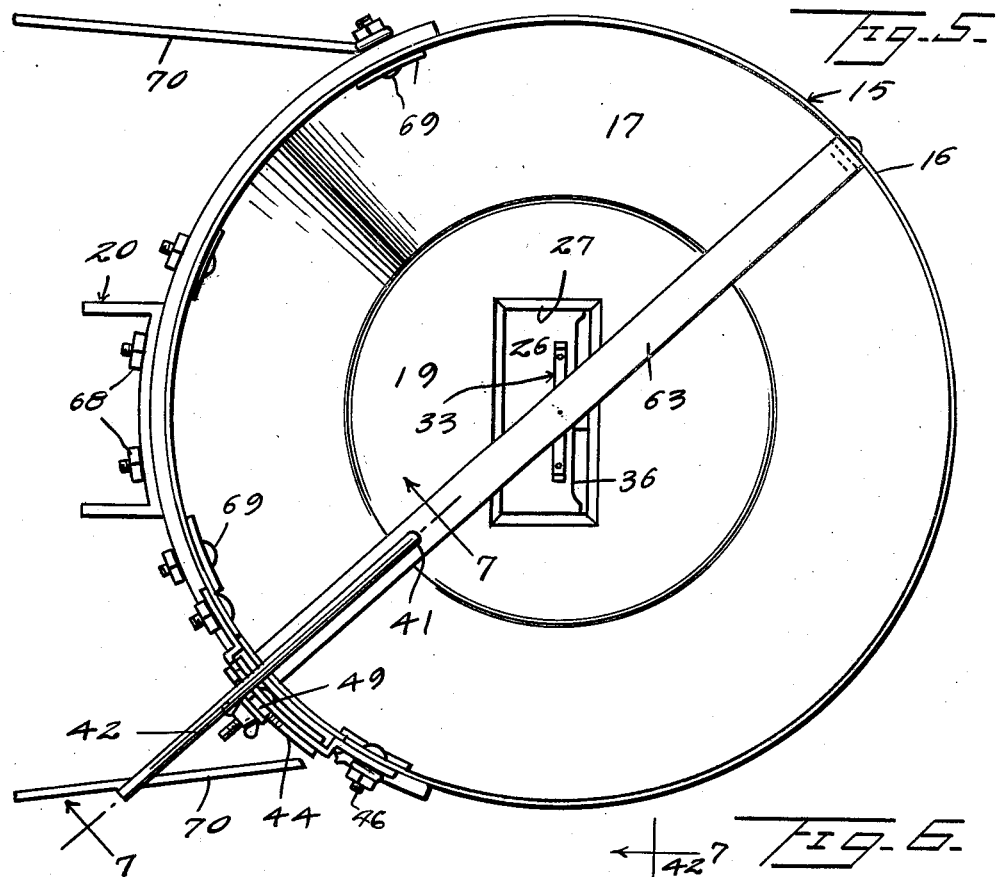
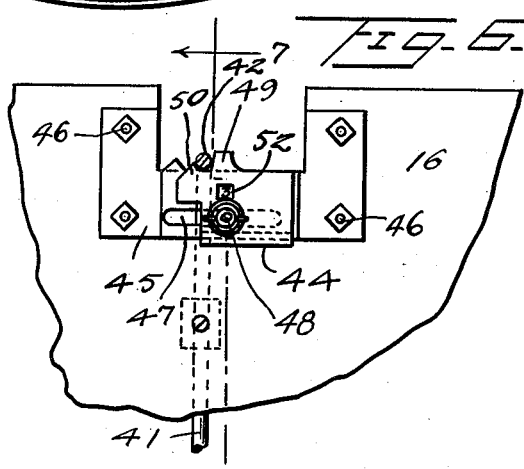
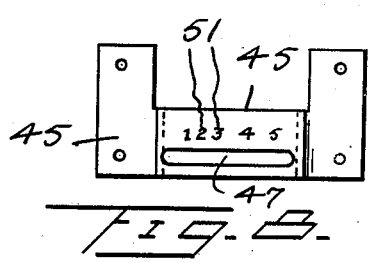
INVENTOR
H. S. Speicher
BY Kimmel & Crowell
ATTORNEYS Patented Apr. 3, 1951

2,547,143

UNITED STATES PATENT OFFICE 2,547,143

SEED SOWER

Harold S. Speicher, Urbana, Ind., assignor to The Cyclone Seeder Co., Inc., Urbana, Ind.

Application January 3, 1950, Serial No. 136,603

3 Claims. (Cl. 275—8)

This invention relates to a seed broadcasting attachment for tractors.

An object of this invention is to provide an attachment for mounting on the drawbar of a tractor and for connection with the power take-off of the tractor for broadcasting seed at the rear of the tractor.

Another object of this invention is to provide in a broadcasting attachment of this kind an improved means for agitating the material as it is being delivered from the hopper, the agitating means being combined with the regulating valve, and the valve being oscillated by the broadcaster shaft so that the material will be evenly distributed by the broadcaster.

A further object of this invention is to provide a broadcasting attachment of this kind which can be easily and quickly mounted on the tractor.

A further object of this invention is to provide a seed or fertilizer broadcasting attachment for a tractor or other vehicle which includes an electrically operated broadcaster deriving its power from a battery, generator or like source of electric current.

With the above and other objects in view, my invention consists in the arrangement, combination and details of construction disclosed in the drawings and specification, and then more particularly pointed out in the appended claims.

In the drawings:

Figure 1 is a detailed side elevation partly broken away and in section of a seed broadcasting device constructed according to an embodiment of this invention.

Figure 2 is a fragmentary vertical section of the device.

Figure 3 is a fragmentary bottom plan of the device taken on the line 3—3 of Figure 2.

Figure 4 is a fragmentary sectional view taken on the line 4—4 of Figure 3.

Figure 5 is a top plan view of the device.

Figure 6 is a fragmentary side elevation of the valve regulating and metering means.

Figure 7 is a fragmentary sectional view taken on the line 7—7 of Figure 5 or 6.

Figure 8 is a detailed side elevation of the metering plate.

Figure 9 is a fragmentary sectional view taken on the line 9—9 of Figure 2.

Figure 10 is a fragmentary sectional view taken on the line 10—10 of Figure 1.

Figure 11 is a fragmentary side elevation of a modified form of this invention.

Figure 12 is a fragmentary sectional view taken on the line 12—12 of Figure 11.

Figure 13 is a fragmentary view of the extensible braces for the device.

Referring to the drawings, the numeral 15 designates generally a hopper which is formed of a cylindrical body 16 and an inverted frusto-conical bottom 17 having a delivery opening 18 in the horizontal lower wall 19 thereof. The hopper 15 is adapted to be supported from an L-shaped support 20 which includes a vertically disposed supporting bar 21, a lower horizontal bar 22 and bracing bars 23.

The lower bar 22 comprises the base of the supporting member 20 and is adapted to be secured by fastening means 24 to the draw bar 25 of a tractor or the like. A valve plate 26 is disposed in the bottom of the hopper 15 and slidably engages a depending flange 27 which is carried by a plate 28 fixed as by spot welding or the like to the bottom wall 19 of the hopper.

The plate 28 is formed with L-shaped opposite ends 29 and a resilient bar or wire 30 formed with an upwardly offset intermediate portion 31 is secured by fastening means 32 to the offset end portions 29 of plate 28 and bears against the lower side of valve plate or member 26 so as to slidingly hold valve plate 26 against the flange 27.

A U-shaped agitating member 33 has the bight 34 thereof welded or otherwise fixed to the upper side of plate 26 and the arms 35 extend upwardly through the opening 18 into the lower portion of the hopper 15. The valve plate 26 has fixed thereto and extending from the delivery edge 36 thereof a fork 37, the purpose for which will be hereinafter described.

An arm 38 is fixed to and extends from the plate 26 oppositely from the fork 37 and has pivotally connected therewith a link or arm 39 which is secured by fastening means 40 to the lower end of an inverted L-shaped valve adjusting rod 41. The upper horizontal rod 42 of the adjusting rod 41 extends laterally and outwardly of the hopper 15 through an opening or cutout 43 formed in the cylindrical wall 16 of the hopper, and the horizontal rod 42 is adapted to be latched in valve regulating position by means of a keeper or metering plate 44 which is adjustably secured to a graduated metering plate 45. The plate 45 is secured by fastening members 46 to the side wall 16, and meter plate 45 is formed with an elongated horizontal opening 47 through which a keeper adjusting bolt 48 is adapted to engage. The keeper member 44 includes a pair of upwardly projecting lugs 49 and 50 between which the arm or lever 42 is adapted to engage.

The metering plate 45 has numerals 51 on the outer side thereof, and a selected one of the numerals 51 is exposed through a window opening 52 which is formed in the keeper plate 44.

A rotatable distributing member 53 is disposed below the hopper 15 and the valve member 26, being secured to a shaft 54 which is rotatably carried by a rearwardly projecting bracket 55 which is secured by fastening members 56 to the vertical support 21.

The shaft 54 is journalled in a bearing 57 carried by the bracket 55 and a flexible shaft 58 is secured at one end to the shaft 54 and is provided at the opposite end thereof with a coupling sleeve 59 for connection with the power take-off shaft 60 formed as part of the tractor.

A flexible shaft holding clip 61 is secured by fastening means 62 to the upright member 21 for firmly holding the outer casing or sheath of the flexible shaft. The vertical side of the valve adjusting member 41 is journalled through a bearing bar 63 which is mounted transversely across the hopper body 16 and is formed with depending opposite ends 64 secured by fastening means 65 to the hopper wall 16.

The upper end of shaft 54 has secured thereto an eccentrically disposed pin 66 which engages between the arms of the fork 37 so that valve member 26 will be oscillated with rotation of shaft 54.

The hopper 15 is secured to the upper end of the support 20 by means of a longitudinally bent bar 67 which is secured by fastening means 68 to the support 20 and fastening members 69 secure the side wall 16 of the hopper to the supporting member 67. A pair of extensible bracing bars 70 are secured to the fastening members 69 and are adapted to be secured at their opposite ends to suitable portions of the tractor for bracing the hopper and support in upright position on the tractor.

The bracing members 70 are formed of bars 70a and 70b (Fig. 13) which overlap and are clamped together in endwise adjusted position by means of a pair of clamps 72.

Referring now to Figures 11 and 12, there is disclosed a modified form of this invention particularly with respect to the operator for the distributing member and the valve oscillator. A rotatable distributing member 53a identical with distributor 53 is secured to a shaft 54a which is formed as the armature shaft of a motor 71. The motor 71 is secured to the rear end portion of the rearwardly projecting bracket 55a which is identical with the bracket 55.

The upper end of shaft 54a has secured thereto an eccentric pin 66a engaging between the fork 37a which is carried by the valve member.

In other respects the structure shown in Figures 10 and 11 is identical with that shown in Figures 1 to 10 inclusive. With the structure shown in Figures 10 and 11 the distributor may be mounted on any type of vehicle which includes a source of electric current supply such as a battery, generator or the like.

In the use and operation of this invention the seed or other material which is to be broadcast is disposed in the hopper 15, and the valve member 26 is adjusted by means of the adjusting member 41 to regulate the width of the delivery opening through which the material is delivered or discharged to the rotating distributing member 53. The distributing member 53 is rotated by connecting the connector 59 with the powered take-off shaft 60 of the tractor.

This device provides a relatively simple means by which seed, fertilizer, or other material, may be broadcast on the ground, the device being so constructed and arranged that it can be easily and quickly secured to the tractor or other vehicle for movement therewith over the ground. Furthermore, the oscillation of the valve plate will have the effect of preventing the seed or other material from clogging the delivery opening, and this oscillation will assure an even delivery of the seed or other material.

What I claim is:

1. A material broadcasting attachment for mounting on the drawbar of a tractor and for connection with the power take-off, said attachment comprising a hopper having a lower delivery opening, a support fixed to said hopper for mounting on the drawbar, a rotatable distributing member below said delivery opening, an adjustable valve regulating the discharge of material from said opening, means for rotating said distributing member, an eccentric fixed relative to said distributor, a fork member fixed to said valve and engaging about said eccentric for oscillating said valve, and a pair of agitating pins carried by said valve projecting upwardly into said opening.

2. A material broadcasting attachment for a vehicle comprising a hopper having a lower delivery opening, a support fixed to said hopper for attachment to the vehicle, a bracket fixed to and extending from said support, a power member carried by said bracket, a vertical shaft rotatable by and extending upwardly from said power member, a rotatable distributing member fixed to said shaft, a valve plate for said opening, means movably mounting said plate on the bottom of said hopper, means adjusting said valve plate relative to said opening, a fork fixed to and extending from said plate, an eccentric pin carried by said shaft engaging between the arms of said fork for oscillating said plate, and a pair of upstanding agitating members fixed to said plate and projecting upwardly into said hopper for agitating the material adjacent said opening.

3. A material broadcasting attachment for a vehicle comprising a hopper having a lower delivery opening, a support fixed to said hopper for attachment to the vehicle, a bracket fixed to said support, a shaft rotatably carried by and extending upwardly from said bracket, a valve plate for said opening, means for adjusting said valve plate, a distributing member fixed to said shaft, a pair of agitating members fixed to the upper side of said plate and projecting upwardly into the lower portion of said hopper, a fork fixed to said plate, and an eccentric fixed to said shaft engaging between the arms of said fork for oscillating said plate and agitating members with rotation of said distributing member.

HAROLD S. SPEICHER.

REFERENCES CITED

The following references are of record in the file of this patent:

UNITED STATES PATENTS

| Number | Name | Date |
|---|---|---|
| 1,751,928 | Lachner | Mar. 25, 1930 |
| 2,234,343 | Harrington | Mar. 11, 1941 |
| 2,334,376 | Bauer | Nov. 16, 1943 |
| 2,451,128 | Thiesse | Oct. 12, 1948 |